Oct. 22, 1968

M. E. FISHER ET AL 3,406,579

POWER TRANSMISSION WITH POWER TAKEOFF

Filed Oct. 3, 1966

INVENTORS
Mark E. Fisher, &
Marion D. Smith
Charles R. White
ATTORNEY

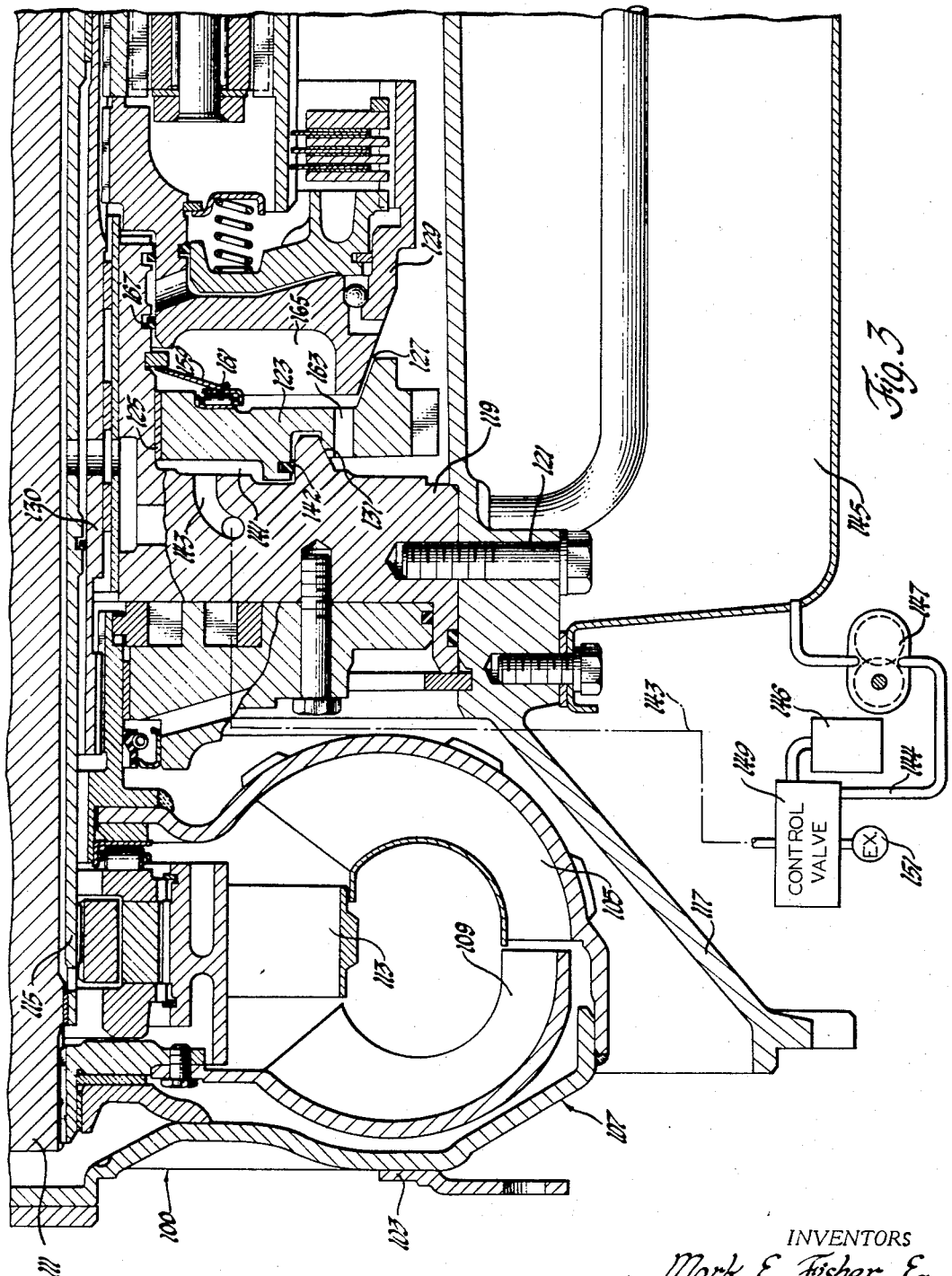

3,406,579
Patented Oct. 22, 1968

3,406,579
POWER TRANSMISSION WITH
POWER TAKEOFF
Mark E. Fisher, Carmel, and Marion D. Smith, Indianapolis, Ind., assignors to General Motors Corporation, Detroit, Mich., a corporation of Delaware
Filed Oct. 3, 1966, Ser. No. 583,626
16 Claims. (Cl. 74—15.84)

ABSTRACT OF THE DISCLOSURE

Power transmission having transmission input and output members and a power takeoff unit. There is a power takeoff gear selectively movable by control means between a ground position in which the gear is retarded from rotation and a drive position in which the gear is frictionally and drivingly engaged with a drive member driven by the transmission input. The power takeoff unit includes a control operated sliding gear which can be moved into engagement with the power takeoff gear to provide a power path to a power takeoff output.

---

Figure 1:
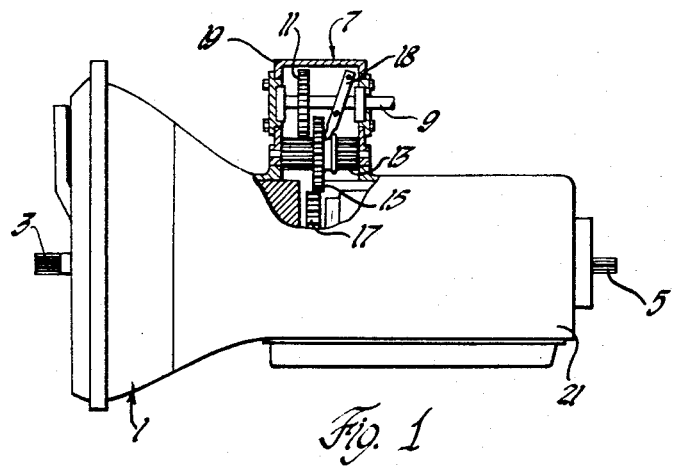

This invention relates to power transmissions and more particularly to a power transmission having a power takeoff unit and plural controls for selectively coupling and uncoupling the power takeoff unit and the transmission.

Vehicle transmission have been provided with power takeoff units for accessory or implement drive. These units usually include a gear box mounted on the transmission case and have a sliding gear selectively engageable with a power takeoff drive gear in the transmission. These prior units have been generally satisfactory but frequently gear clash occurs when the power takeoff drive gear is engaged with the sliding gear when the transmission is operating. This not only produces objectionable noise but damages or rapidly wears the gear teeth. Furthermore, when these gears are meshed there is rapid load pick up which is often not desirable and the load may lug the vehicle engine down or stall the engine before disengagement can be accomplished. With the present invention the load can be picked up more gradually due to clutch slippage and the possibility of stalling or lugging the vehicle engine is diminished.

The present invention includes a novel clutching arrangement through which the power takeoff drive gear may be axially moved and grounded by a control with the transmission running. The sliding gear can then be moved by another control into mesh with the power takeoff drive gear without gear clash and attendant noise and damage. Means are provided to then move the power takeoff drive gear into engagement with a driven member in the vehicle transmission for achieving a smooth pick up of the load. With this invention improved intermittent operation of a power takeoff unit is accomplished and the vehicle operator is provided with greater control of the unit.

It is an object of this invention to provide a plurality of separate controls to selectively couple a power takeoff unit and a drive member.

Another object of this invention is to provide a power transmission selectively coupled to an output by operation of a plurality of separate and independent controls.

Another object of this invention is to provide a transmission having an input, an output and a power takeoff unit having an output and in which means are provided to engage the power takeoff unit and the transmission without gear clash and accomplish smooth load pick up by the output of the unit.

Another object of this invention is to provide a power transmission having an axially movable power takeoff drive gear biased in one direction by a force to ground the drive gear thereby facilitating meshing engagement of the drive gear and a sliding gear of a power takeoff unit and being subsequently biased in an opposite direction by another force into clutching engagement with a driven member in the transmission to provide for power takeoff unit load pick up.

Figure 2:
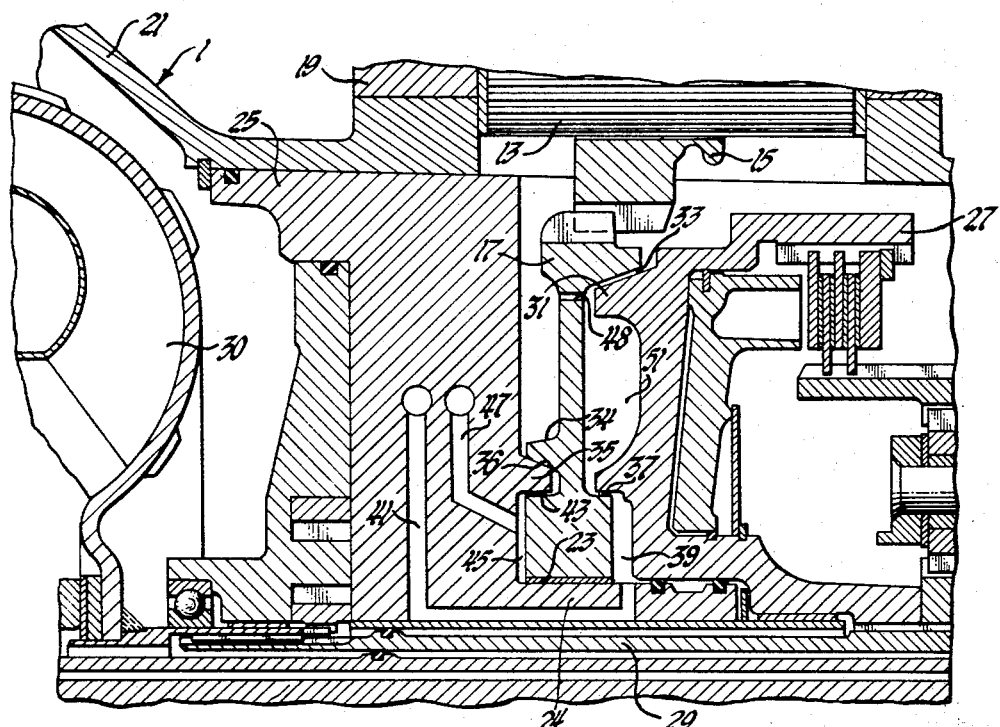

These and other objects of the invention will become apparent from the detailed description of particular embodiments of the invention and the drawings in which:

FIGURE 1 is an elevation view of part of a torque converter transmission and power takeoff, FIGURE 2 is a sectional view of FIGURE 1 illustrating a first embodiment of the invention, FIGURE 3 is a sectional view of part of a torque converter transmission illustrating a second embodiment of the invention.

Referring now to FIGURE 1, there is illustrated a torque converter transmission 1 having power plant driven input 3, main output shaft 5 for vehicle drive and power takeoff unit 7. This unit has an output shaft 9 for accessory drive driven through a gear train formed by gears 11, 13, 15 and power takeoff gear 17. Gear 15 is splined on gear 13 and is longitudinally moved thereon into and out of engagement with gear 17 by operation of crank or control 18 pivoted to the casing 19 which houses gears 11, 13 and 15. Casing 19 is suitably fastened to the transmission housing 21.

As shown in FIGURE 2, the power takeoff drive gear 17 is rotatably and slidably mounted on a bearing 23 which, in turn, is mounted on an annular shoulder 24 of the support 25 secured within housing 21. The power takeoff gear may be selectively coupled with and driven by drum 27 which is splined to and driven by sleeve shaft 29 coupled to the converter pump 30. As shown, the drum is formed with a projecting shoulder 31, having a conical friction surface which is engageable with a mating friction surface formed on a shoulder of the power takeoff gear to provide a cone clutch 33 for coupling the power takeoff gear to the drum 27. The power takeoff gear and the support have shoulders 34 and 35 formed with engageable and mating friction surfaces to provide a brake 36. The power takeoff gear and drum 27 are further shouldered to provide a labyrinth seal 37 establishing a pressure chamber 39. This chamber is coupled to a source of fluid under pressure such as lube pressure through a passage 41. The power takeoff gear and support 25 are formed to provide another labyrinth seal 43 to establish a chamber 45 that is coupled to another source of fluid under pressure, which is of a higher pressure than the first mentioned source, by fluid passage 47. Suitable valve means which will be described in connection with FIGURE 3 are provided to direct and regulate fluid to and exhaust fluid from chamber 45. An aperture 48, which is larger than the labyrinth seal 37 formed by the close fit of shoulders on the drum and the power takeoff gear, prevents chamber 51 formed therebetween from being filled with a fluid which would adversely affect operation of the cone clutch 33.

In operation, if it desired to engage the sliding spur gear 15 with the power takeoff gear 17, chamber 45 is exhausted by operation of a valve or other mechanism and the lube pressure in chamber 39 will shift the power takeoff gear on the bearing 23 to the left until brake 36 is fully engaged and any rotation of the power takeoff gear is halted. Then crank 18 is turned, shifting the sliding gear 15 on the gear 13 into mesh with the power takeoff gear. Since the power takeoff gear is grounded at this time, there is no gear clash when these two gears are brought into mesh with each other. The pressure chamber 45 is then opened to a source of high pressure through the operation of a suitable control such as the valve shown in FIGURE 3. The power takeoff gear will be axially moved to the right by this high pressure, overcoming the opposing force of lube pressure in chamber 39, so that the cone clutch 33 is engaged and is driven by the drum 27. Since the gear 15 is in mesh with the power takeoff gear 17, the power takeoff unit gear train and output shaft 9 are driven. It will be appreciated that the clutch 33 has some slippage when initially engaged to provide for smooth load pick up and the pressure bias in chamber 45 provides for high clutch capacity.

For disengagement of the cone clutch 33 and the power takeoff unit from the transmission, the chamber 45 is again exhausted with lube pressure moving the power takeoff gear 17 to the left to engage the brake 36.

In the second embodiment of the invention illustrated in FIGURE 3, there is a torque converter transmission 100 having a power plant driven input 103 connected to drive pump 105 of a torque converter 107. The converter has a turbine 109 driven by fluid exiting from the pump which is connected to drive main shaft 111. The stator 113 is connected for reaction as disclosed in copending application Serial No. 490,181, filed September 27, 1965, now Patent No. 3,371,555, through a sleeve shaft 115. The torque converter is housed in the casing 117 to which a support 119 is secured by bolts 121.

A power takeoff gear 123 is slidably and rotatably mounted on an annular bearing 125 which, in turn, is mounted on the support 119. The power takeoff gear 123 is engageable with a transfer gear of a power takeoff unit, not illustrated in this figure. This latter mentioned gear, however, corresponds to the gear 15 of FIGURE 1, and the power takeoff unit is similar to the power takeoff unit of that embodiment. The power takeoff drive gear 123 includes a cone clutch 127 provided by the mating conical friction surfaces formed on projecting shoulders of gear 123 and a drum member 129. The drum member is splined to and driven by a sleeve shaft 130 which, in turn, is driven by the pump 105. A ground provided by brake 131 is formed by mating friction surfaces formed by projections on gear 123 and the support structure 119.

As illustrated, a control chamber 141 is established between support 119 and gear 123 by bearing 125 and annular seal 142. Fluid passages 143 and 144 are provided to connect a source of fluid contained in sump 145 to this chamber. A pump 147 and a control and pressure regulator valve 149 are interposed in these passages with the pump supplying a pressure which is regulated by valve 149 to the chamber 141. The control valve may be identical with the control valve shown in FIGURE 2 of Serial No. 472,483, filed July 16, 1965, now Patent No. 3,358,444. This control valve can function to block the input of fluid from the source into passage 143 and exhaust the chamber 141 by operation of an air piston 146 to move the valve to an exhaust position as more particularly stated in that identified application.

A plate spring 159 which is grounded to support 119 by a snap ring or other suitable means has an outer peripheral portion engaging annular antifriction device 161 seated on the power takeoff gear 123. As viewed in FIGURE 3, this spring normally biases gear 123 to the left to cause engagement of the brake 131. The power takeoff gear 123 has openings such as openings 163 so that any oil leaking into cavity 165 past the seal 167 or through other passages will exhaust and not build up a pressure head in opposition to apply force in chamber 141.

In operation the control valve normally regulates a regulated pressure into chamber 141 which supplies a biasing force which overcomes the force of plate spring 159, and moves the power takeoff gear axially to the right and causes engagement of the clutch 127. The regulated pressure bias in chamber 141 provides for high clutch capacity. With clutch 127 engaged, the drum 129 drives the power takeoff gear which is then coupled by the power takeoff power train illustrated in FIGURE 1 to drive the power takeoff output shaft 9. This clutching, as regulated by the pressure in chamber 141, provides for smooth load pick up as in the first embodiment. To uncouple the power takeoff from the transmission drive, the control valve is actuated by an air piston as described in Ser. No. 472,483 or other suitable means to exhaust chamber 141 through exhaust 151. With chamber 141 exhausted, the plate spring provides a bias to effect engagement of brake 131 and thereby ground the power takeoff gear 123 to support 119.

When the power takeoff is grounded, the sliding gear of the power takeoff unit may be moved by operation of a lever into engagement with the power takeoff gear 123 without gear clash. The cone clutch is then engaged for accessory drive.

From the above description it will be understood each embodiment of the invention includes a sliding gear connection and a selectively engageable clutch control for connecting and disconnecting the power takeoff from the vehicle power transmission. If desired, the sliding gear may be moved by the crank into engagement with the power takeoff gear and the power takeoff can be connected and disconnected from the vehicle transmission solely by operation of the clutching devices. Alternatively, the power takeoff drive clutch (33 and 127) can be engaged and the power takeoff can be connected to and disconnected from the vehicle transmission solely by appropriate movement of the sliding gear into and out of engagement with the power takeoff drive gear.

It will be appreciated that many designs other than those shown in the figures can be made utilizing the ideas and principles stated in this specification and illustrated in the drawings. Therefore, it will be understood that the drawings and detailed description of preferred embodiments are for illustrative purposes and are not to impart limitations to the invention; the scope of the invention being defined in the claims which follow.

We claim:

1. In combination, a power transmission having an input and an output, a power takeoff unit having an input member and an output member, said transmission having a drive member operatively connected to said input and having a driven member, said drive and driven members each having selectively engageable friction means thereon, and motor means for relatively moving said drive and driven members into a position whereby said friction means are engaged and said input drives said drive and driven members, and means to couple and uncouple said power takeoff input member and said driven member to thereby connect and disconnect said power takeoff output member and said transmission input.

2. The combination defined in claim 1, in which said driven member is a rotatable power takeoff drive gear, a ground member, means for biasing said drive gear into engagement with said ground member to retard rotation thereof, said input member being a slidable gear, said last mentioned means including control means for sliding said slidable gear into and out of meshing engagement with said drive gear.

3. The combination defined in claim 1, and including hydraulic control means for said motor means to effect the selective engagement and disengagement of said friction means, said means for coupling and uncoupling said input member and said driven member forming an additional control means.

4. The combination of claim 1, in which said driven member is rotatable by said drive member and is mounted for axial movement in said transmission, opposing pressure means for biasing said driven member in opposite directions, second friction means selectvely engageable to retard rotation of said driven member in response to axial movement thereof in one direction, said input member being engaged with said driven member subsequent to the retardation of the rotation thereof by said friction means.

5. The combination of claim 4, in which said opposing pressure means includes opposing chambers each having a fluid under pressure therein, and means for exhausting fluid from at least one of said chambers thereby allowing the fluid in the other of said chambers to move said driven member in one axial direction.

6. The combination of claim 4, in which said transmission includes a stationary support member, bearing means movably mounting said driven member on said support, said driven member and said support cooperating to provide a pressure chamber, control means for admitting a fluid under pressure to said chamber for moving said driven member in one axial direction and for exhausting fluid from said chamber, said pressure means including means for moving said driven member in an opposite axial direction in response to the exhaust of fluid from said chamber.

7. The combination of claim 6, in which said last mentioned means is a spring member.

8. The combination of claim 7, in which said control means includes a valve operative to regulate a predetermined fluid pressure in said chamber and to exhaust fluid from said chamber.

9. The combination of claim 7, in which said spring member is grounded to said stationary support and is operative to urge said driven member toward said stationary member to effect engagement of said second friction means.

10. In a power transmission having an input and an output, a power takeoff unit having an output, means for selectively connecting said last mentioned output to said input including first and second rotatable members, one of said members being driven by said input, means for relatively moving said members toward and away from each other, friction means for connecting said members together in response to predetermined relative movement of said members toward each other, a stationary member in said transmission providing a ground, friction means for connecting one of said first mentioned members to said stationary member in response to predetermined relative movement of said first mentioned members away from each other.

11. The power transmission of claim 10, in which said means for moving said first mentioned members includes first and second fluid receiving chambers, means coupling each of said chambers to a separate source of fluid under pressure, one of the pressure sources having a pressure higher than the other of said sources, and control means for selectively opening said chamber accommodating the highest fluid pressure to exhaust to allow pressure in the other of said chambers to move one of said first mentioned members into frictional engagement with said stationary member.

12. The power transmission of claim 10, in which said means for relatively moving said first and second members includes a fluid receiving chamber and an opposing spring means, said spring means being grounded to said support for biasing one of said first mentioned members toward said stationary member to effect engagement of said last mentioned friction members, control means for hydraulically coupling said chamber to a source of fluid under pressure, said chamber when pressurized by fluid from said source biasing said first and second members together to effect engagement of said first mentioned friction means.

13. In a power transmission having an input and an output, a first member driven by said input, a second member axially movable in said transmission, a third member providing a ground, first selectively engageable friction means for coupling said first and second members to permit said first member to drive said second member, second selectively engageable friction means for coupling said second and third members for retarding rotation of said second member, said first and second members defining a pressure chamber therebetween, means connecting said first pressure chamber with a source of fluid under pressure, said second and third members defining a second pressure chamber therebetween, control means for supplying a fluid under pressure higher than the pressure of the first mentioned source to said second chamber, said second member being movable toward said first member in response to admission of the higher fluid pressure into said second chamber to selectively engage said first friction means, said control means being operative to exhaust said second chamber of fluid to permit the fluid in said first chamber to move said second member toward said third member causing engagement of said second friction means, and means for exhausting fluid between said first and second members outside of said first chamber to facilitate re-engagement of said first friction means subsequent to re-admission of fluid back into said second chamber.

14. The power transmission of claim 13, including a fourth member selectively engageable with said second member, and a power takeoff member driven by said input when said first and second member are engaged and said second and fourth member are engaged.

15. In a power transmission having an input and an output, a first member driven by said input, a second rotatably mounted member movable toward and away from said first member, a third member providing a ground, first friction means for coupling said first and second members to enable said first member to drive said second member, second friction means for coupling said second and third members for retarding rotation of said second member, said second and third members cooperating to establish a fluid receiving chamber therebetween, means for hydraulically coupling said chamber with a source of fluid under pressure, said last mentioned means including control means selectively operative for supplying fluid to said chamber and for exhausting fluid from said chamber, spring means to provide a biasing force tending to move said second member toward said third member when said chamber is exhausted of fluid and to cause engagement of said second friction means, said second member being moved toward said first member in response to admittance of fluid into said chamber to disengage said second friction means and cause engagement of said first friction means to thereby allow said first member to drive said second member.

16. The power transmission of claim 15, including a fourth member selectively engageable with said second member, a power takeoff member driven by said input in response to engagement of said first and second members and said second and fourth members.

References Cited
UNITED STATES PATENTS

| | | | |
|---|---|---|---|
| 2,923,178 | 2/1960 | Miller | 74—15.86 X |
| 3,065,643 | 11/1962 | Mark et al. | 74—15.84 X |
| 3,166,167 | 1/1965 | Kinsman | 192—18 |
| 3,213,984 | 10/1965 | Cook | 192—18 |
| 3,319,491 | 5/1967 | Simpson | 74—15.86 X |

FRED C. MATTERN, JR., *Primary Examiner.*

LEONARD H. GERIN, *Assistant Examiner.*